United States Patent [19]

O'Meara

[11] 4,016,415
[45] Apr. 5, 1977

[54] ADAPTIVE IMAGING TELESCOPE WITH LINEAR SENSING AND MOVABLE MIRROR PHASE SHIFTING

[75] Inventor: Thomas R. O'Meara, Malibu, Calif.

[73] Assignee: Hughes Aircraft Company, Culver City, Calif.

[22] Filed: June 24, 1974

[21] Appl. No.: 482,188

[52] U.S. Cl. .......................... 250/201; 350/160 R
[51] Int. Cl.² ......................................... G01J 1/20
[58] Field of Search .......... 250/201, 202, 203, 578; 350/160, 162 R, 162 ST, 17, 205; 178/DIG. 25; 331/94.5

[56] References Cited

UNITED STATES PATENTS

| | | | |
|---|---|---|---|
| 3,594,660 | 7/1971 | Huggett | 350/160 R |
| 3,705,758 | 12/1972 | Haskal | 350/160 R |
| 3,713,042 | 1/1973 | Kinsel | 350/160 R |
| 3,731,103 | 5/1973 | O'Meara | 250/199 |
| 3,846,628 | 11/1974 | Towne | 250/201 |

Primary Examiner—David C. Nelms
Attorney, Agent, or Firm—W. H. MacAllister, Jr.; M. E. Gerry

[57] ABSTRACT

An adaptive energy telescope having a linear sensor for detecting a received optical image. A movable mirror phase shifter is positioned near the telescope aperture and is responsive to the received optical image. A linear image quality sensor is optically coupled to the phase shifter. The phase shifter may have a plurality of mirrors each attached to a piezoelectric crystal so that the mirrors are displaced in accordance with the voltages impressed across the piezoelectric crystals. This phase shifter may also be provided with a single planar reflective sheet instead of a plurality of mirrors. The sensor may consist of a plate with a pinhole for admitting a portion of the optical image and a transducer at one side of the plate for converting the portion to an electrical signal. The sensor may also consist of a transform of the Fourier or Hadamard types and a low and high frequency detector optically coupled to the transform mechanism which in turn is electrically connected to an electronic divider.

21 Claims, 11 Drawing Figures

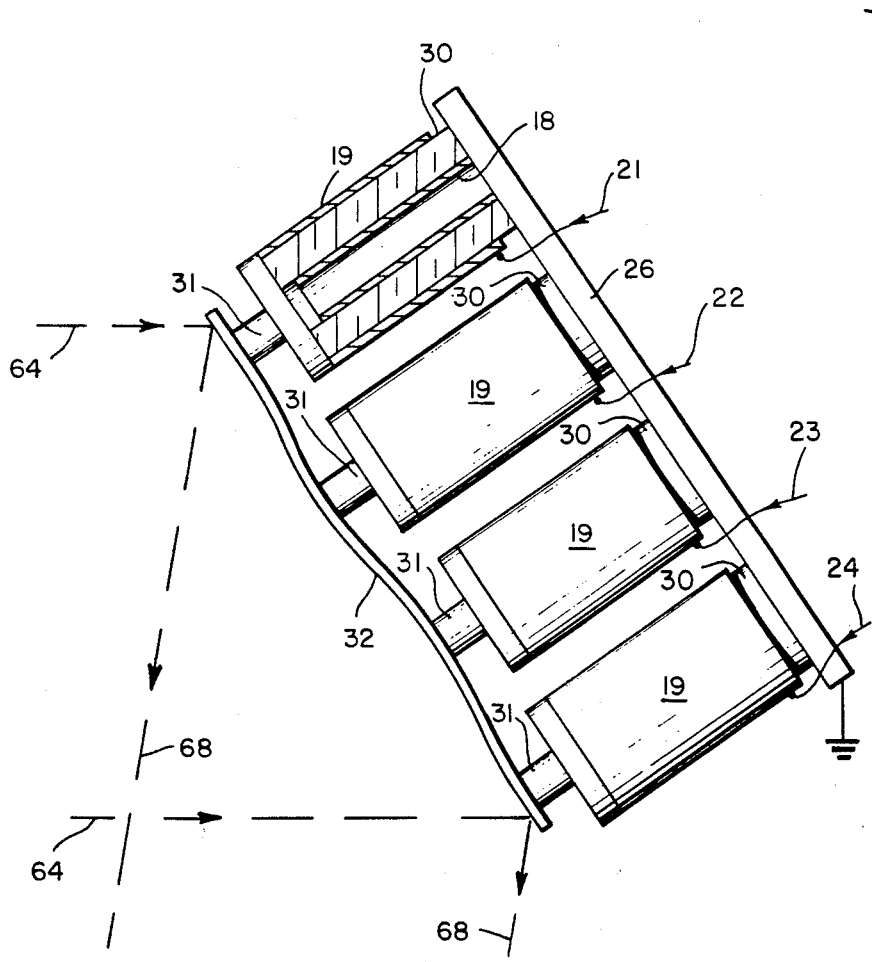
Fig. 4.
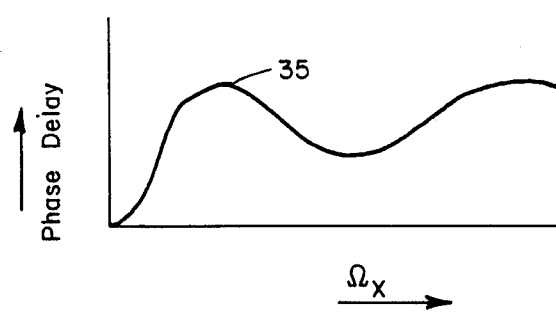

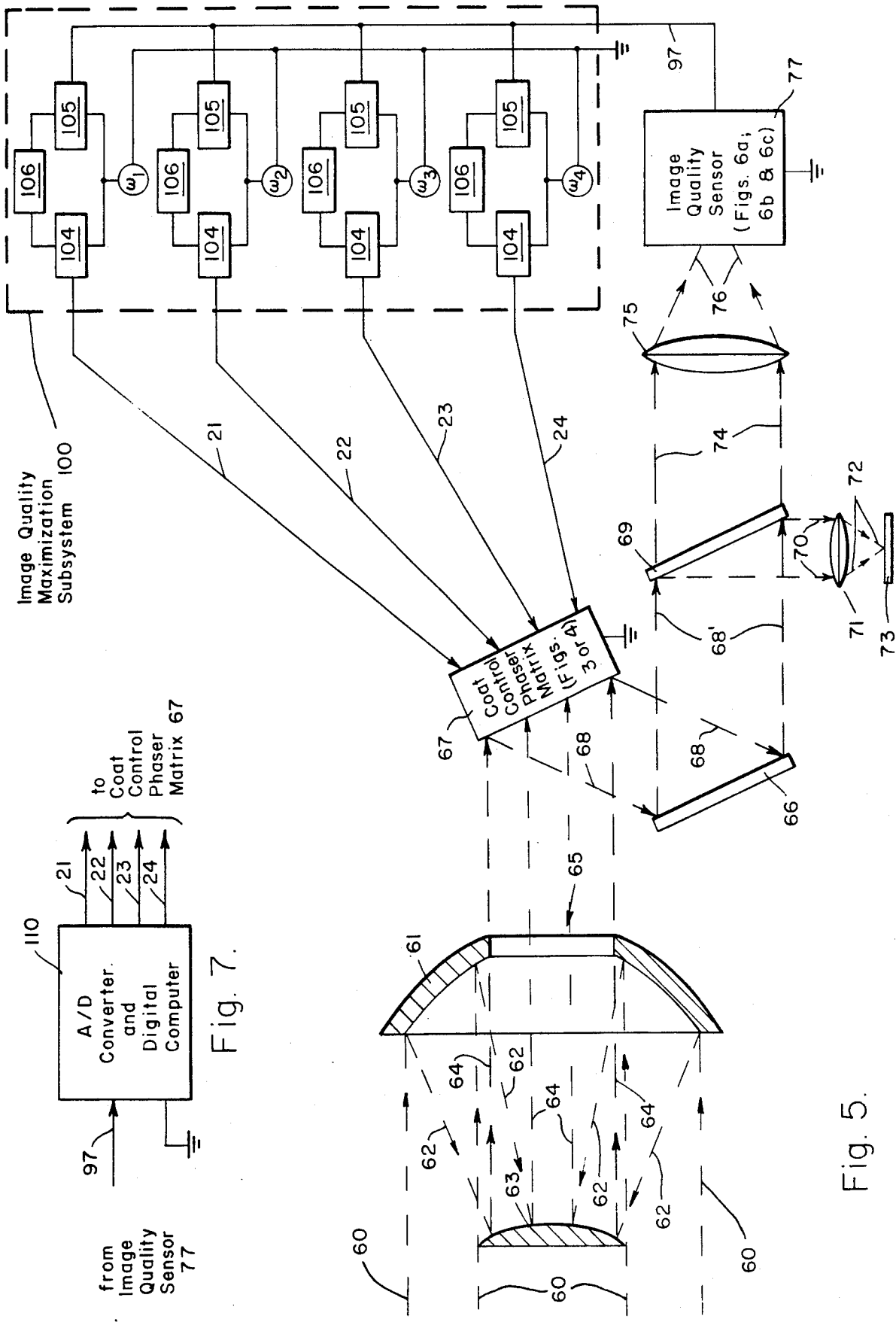

ADAPTIVE IMAGING TELESCOPE WITH LINEAR SENSING AND MOVABLE MIRROR PHASE SHIFTING

CROSS-REFERENCE TO RELATED COPENDING APPLICATIONS

Applications, Ser. Nos. 482,175; 482,185; 482,187; and 482,186 were all filed June 24, 1974, concurrent with this application.

BACKGROUND OF THE INVENTION

This invention is in the field of adaptive imaging telescopes, and in particular such telescopes that compensate images viewed through atmospheric turbulence.

The atmosphere has a substantial effect on a portion of a wavefront impinging on a small aperture, say four inches or less in diameter at visible wavelengths. The impinged wavefronts can be decomposed into phase effects, and amplitude or scintillation effects. The phase effects are of major importance causing nearly a spatially uniform but time-varying or random advance or retardation of the wavefront as a whole which can easily be as large as several times $2\pi$ radians.

In large telescopes which may be considered as compounded telescopes due to superposition of the above small apertures, the first effect mentioned is overwhelmingly troublesome. More specifically, with a point image the subapertures may be paired, and it may be shown that each pair of subapertures generates its own characteristic Fourier component fringe pattern in the image plane. In the distorionless propagation case, all of these fringe patterns add constructively at the image center and effectively add more and more destructively at positions in the image plane progressively removed from the center. Since the first mentioned effect can change either the position of the fringes or the phase of the optical carrier which is spatially modulated by them, it can readily happen that the desired constructive interference on axis, and destructive interference off axis, is not obtained. Consequently, peak image intensity is reduced and the image is not narrowed by the superposition of fringe patterns, or at least it is not narrowed to the full potential of the system. Thus, images are smeared out by these atmospheric effects and imaging through long atmospheric paths with apertures exceeding four inches is usually limited by this phenomenon rather than by the optics of the imaging system.

Prior art systems have employed several restoration schemes. One classificational scheme is post-film-recording or restoration systems, and another is pre-film-recording or precorrection systems. By far, the largest number of schemes have been of the post-film-recording category and, as one consequence, have not been real-time systems. Of the pre-film-recording techniques, holographic methods have been the most widely explored, and again these have not been in real time. Many suggested techniques, incuding holography have required a reference, that is a known, ideally a small source, to one side of the unknown source object. In most practical cases an ideal reference natural source is simply not available.

SUMMARY OF THE INVENTION

It is, therefore, an object of the instant invention to reduce the image smearing results by introducing corrective phase control across the receiving aperture which effectively restores the desired fringe superposition, and hence the clarity of the resultant image.

Another object of the instant invention is to eliminate the need for an adjacent reference source, nor a priori, make assumptions that symmetrical source distributions exist in the assumed souce.

A further object is to provide a real-time operative system. That is, image corrections in the instant system must be accomplished within $10^{-2}$ seconds, since the atmosphere may substantially change in a period not much greater than this time period.

A still further object is to provide a system fully compatible with post-film recording restoration techniques, which when combined with the instant invention extend thereto an additional benefit.

Accordingly, the instant invention employs separate subaperture phase shifters to introduce equal and opposite (time-varying) phase shifts across each aperture in such a way as to compensate for the atmospheric shifts.

For example, in astronomical imaging it is desired that the image be made as bright and sharp as possible. To achieve this purpose a measure of the image contrast or sharpness is needed as well as a technique for maximizing it with respect to the control variables, such as phase delay applied to the waves as received at each subaperture.

Two measures of image quality or contrast may be advantageously employed. The first measure of contrast is best understood by one-dimensional image point intensity distributions, and the second measure of contrast pertains to the relative high-to-low spatial frequency content in the image.

In implementing the system an image quality sensor of the Fourier or Hadamard transform type, as well as other sensors of different transform response may be used.

Phase control is provided in this system which may be dithered at appropriate sinusoidal rates, with separate synchronous detection of each of the induced amplitude modulation components in the image quality sensor or detector output.

The detected or sensed inputs from either of two image quality sensors provide error signals for driving the optical phase shifters in a manner that outputs from the sensors are maximized.

BRIEF DESCRIPTION OF THE DRAWINGS

FIG. 4 is an elevation view of a continuous surface phase shifter and its corresponding response curve of phase delay, usable in lieu of the phase shifter of FIG. 3, and providing smooth phase variation with respect to distance.

FIG. 5 is an optical-electrical schematic of the telescope system illustrating error sensing means and wavefront error correcting means utilizing the moving mirror phase shifters of either FIGS. 3 or 4.

FIG. 7 shows an alternate digital system in lieu of the analog circuitry used in FIG. 5.

DETAILED DESCRIPTION

Figure 1A:
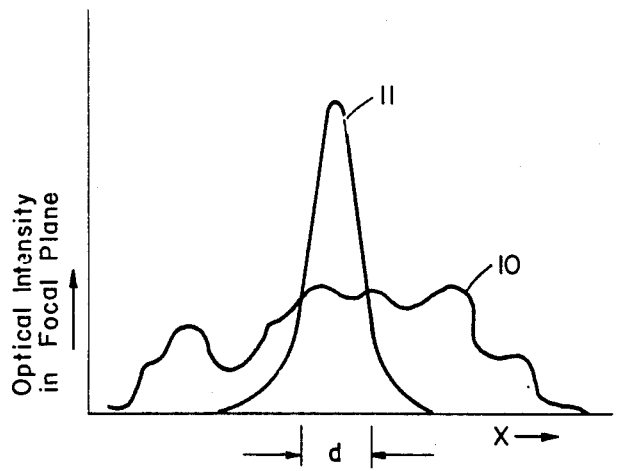
FIGS. 1a and 1b are response curves of the optical intensity distribution in the image plane ahead of and behind a pinhole sensor showing improvement in the image quality in accordance with this invention.
Figure 1B:
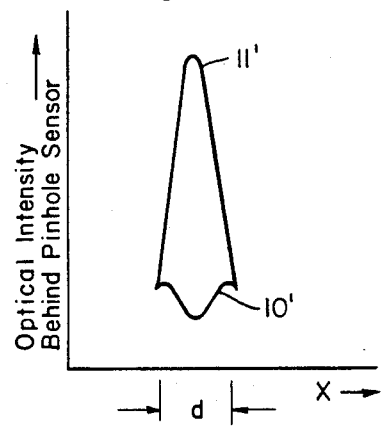

Referring to FIGS. 1a and 1b, the object to be imaged is assumed to include an isolated glint or highlight in its reflectivity distribution, wherein the optical intensity in the focal plane of such distribution is shown at 10 resulting from an atmospherically distorted image. On the other hand, optical distortion due to atmospherics is compensated for by the instant system so as to provide an optical intensity response in the focal plane of such distribution along the X ordinate (and similarly along the Y ordinate, not shown), as represented by curve 11. The width of this response is essentially limited by the diffraction associated with the diameter of the receive optics.

In the uncompensated condition of intensity curve 10 the image is spread and is overlapped by images from adjacent glints or highlights. The associated measure of image sharpness is the amount of photon flux which passes through a pinhole as at $d$ of dimensions somewhat less than the dimensions of the high quality image as represented by distribution curve 11. The distribution curves 10 and 11 are therefore responses as received at the image focal plane prior to the optical beam passing through pinhole $d$. Hence, the net optical flux is seen to be much greater in the case of curve 11, which is the undistorted or atmospherically compensated case as compared to uncompensated case represented by curve 10, and thus provides a valid measure of image quality.

Upon passing through pinhole $d$, it may be seen that curve 11 distribution results in distribution 10', whereas curve 11 distribution results in distribution 11'.

Figure 2A:
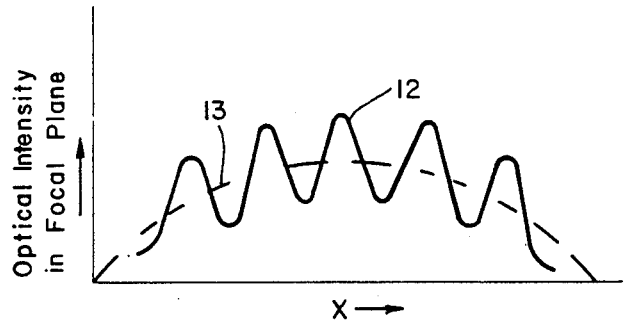
FIGS. 2a and 2b are response curves of the optical intensity distribution in the image plane and the corresponding optical intensity distribution in the optical cosine transform means output showing that improved image quality provides an improved ratio of high to low spatial frequency content at a particular spatial frequency.
Figure 2B:
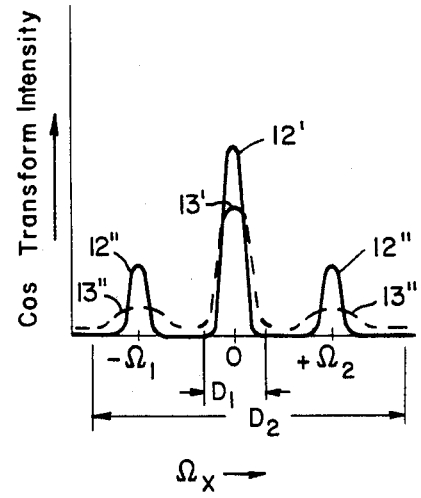

Referring to FIGS. 2a and 2b, a second measure of contrast is the relative high-to-low spatial frequency content in the image. These figures illustrate an image of and object which contains an intensity or reflectivity distribution which is sinusoidal function of dimensional extent as at 12. Without distortion from atmospheric turbulence or the like, the spatial sinusoidal frequency distribution is retained in the image, whereas with distortion the spatial modulation is effectively reduced to nearly zero, as illustrated by curve 13. The operation of the phase or path length correction system in the present invention is directed to substantially restore the image as shown by the undistorted curve 12. Whereas in FIG. 2a the optical intensity is shown as a function of one spatial ordinate X (spatial representation of ordinate Y being the same as X but not shown herein for simplicity), in FIG. 2b the optical intensity is in terms of a cosine transform as a function of spatial frequency $\Omega_x$ ($\Omega_y$ spatial frequency is not shown for simplicity but is similar to $\Omega_x$).

In general it will be recognized that the loss in spatial modulation will be a function of the spatial modulation frequency itself and that there is some loss from the aperture limitations inherent in the telescope even without propagation distortion (shown in FIG. 2c).

Figure 6A:
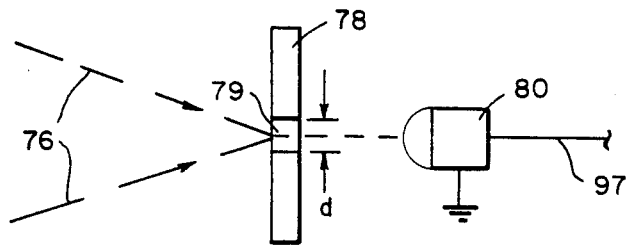
FIG. 6a is an optical-mechanical schematic of an image quality sensor of the pinhole type in accordance with this invention.
Figure 6B:
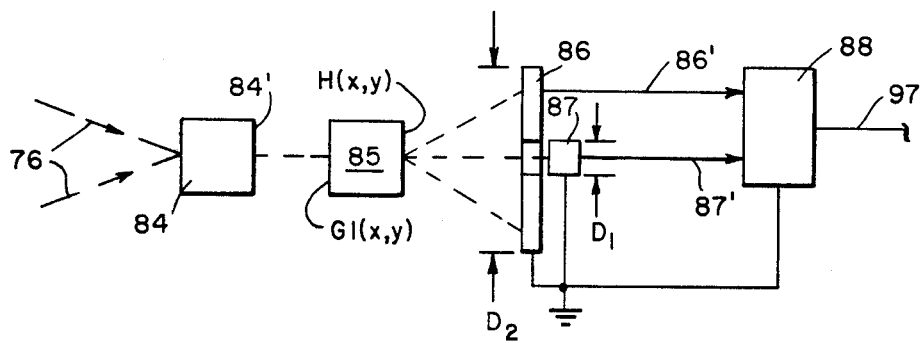
FIG. 6b is an optical-mechanical schematic of the Fourier transform arrangement used as an image quality sensor in the instant invention.
Figure 6C:
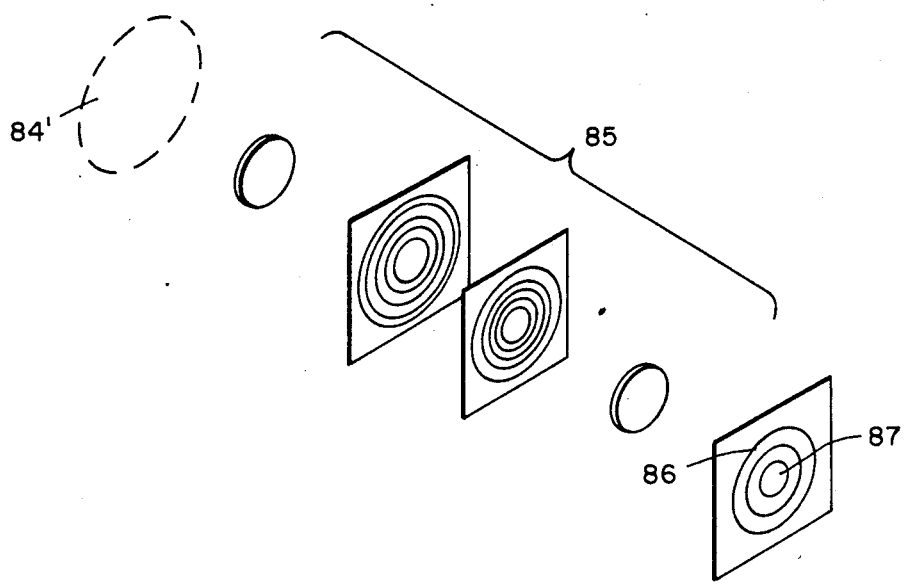
FIG. 6c is a structural arrangement of most of the components of FIG. 6b.

Diameters $D_1$ and $D_2$ of the high and low frequency detectors of image quality sensor 77 as utilized in FIGS. 6b and 6c are shown in their spatial frequency domain (transform) of FIG. 2b. In FIG. 2b it can be seen that, in the absence of distortion, the operation by the Fourier cosine transform on the sinusoidal function produces curve 12' with a pair of peaks 12" at $+\Omega_1$ and $-\Omega_1$. These peaks will be substantially larger in amplitude than for the case of the transformed image with atmospheric distortion.

It will be noted that the higher spatial frequencies which contain the essence of the image detail are virtually eliminated by the atmospheric distortion while the lower spatial frequencies are but little effected. Accordingly the ratio of high to low spatial frequency content is an appropriate measure of image quality. Further it is a measure which is independent of the absolute brightness of the source.

Figure 3:
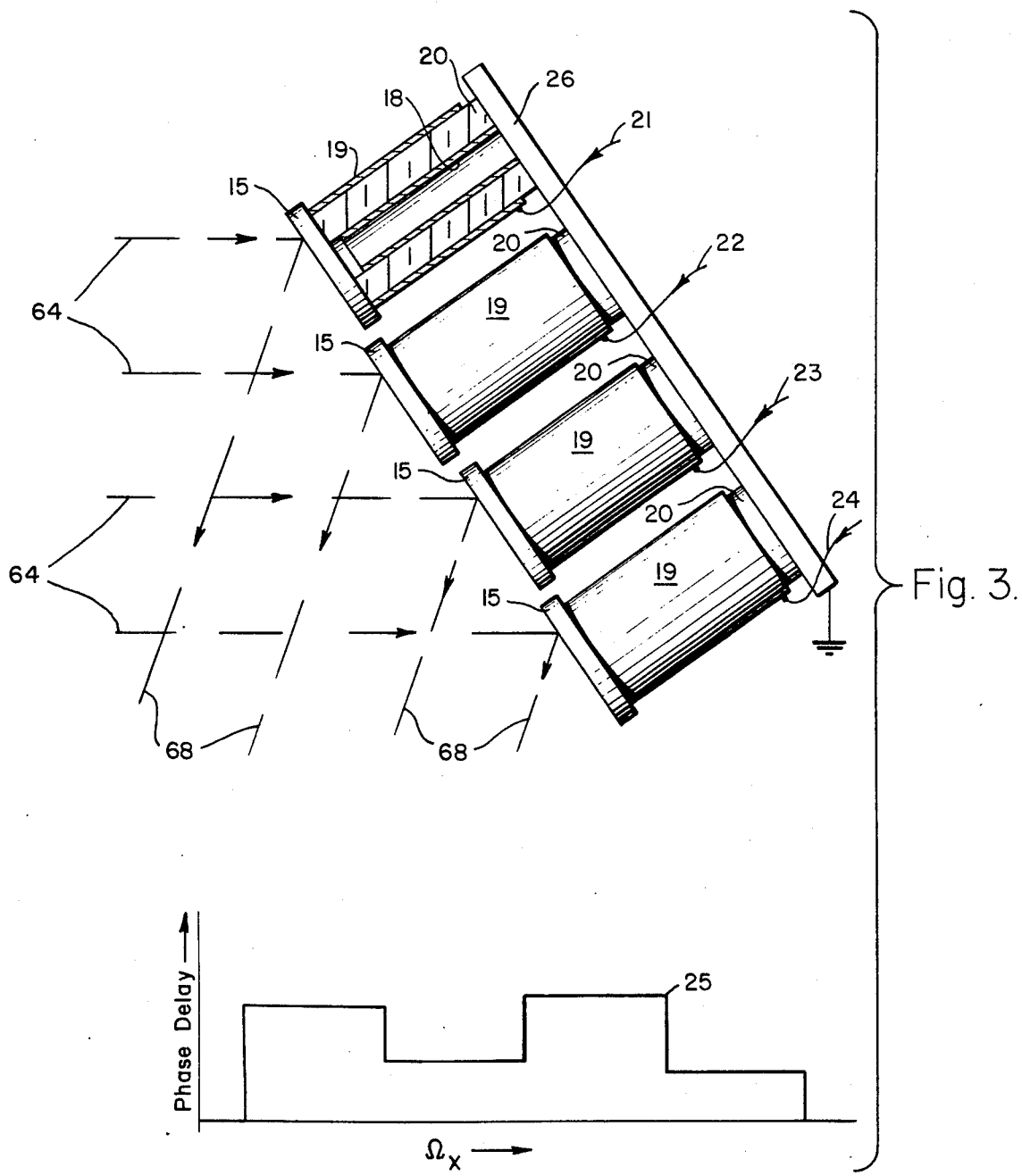
FIG. 3 is an elevation view of a moving-mirror phase shifter and corresponding response curve of phase delay as a function of discrete step phase variation.

Referring to FIG. 3, one method for constructing the phase shifter required for compensating the distorted received wavefront is illustrated therein. This figure illustrates a series of flat reflecting mirrors 15 which are relatively displaced by piezoelectric actuators 20 to produce a phase delay of optical beam 64 in reflected wavefront 68 appropriate to compensate a particular distorted wavefront. The actual displacements, which are typically smaller than a few optical wavelengths are exaggerated for illustrative purposes. Piezoelectric actuators 20 are cylinders each having electrode 18 plated on an inner bore of the cylinder and electrode 19 plated on the outer periphery of each cylinder and may be advantageously constructed of PZT (lead-zirconate-titanate) material. Inner surfaces 18 are at ground potential and serve as a return electrical signal path in the system schematic of FIG. 5. Wires 21, 22, 23 and 24 are electrically connected to the outer cylinder plated surfaces as at 19 for providing electrical connection to perturbation circuit 100 of FIG. 5 or to computer 110 of FIG. 7. Electrically conductive ground plate is provided at 26 for enabling electrical return path from the phase shifters.

Referring to FIGS. 3 and 4, it may be stated that although it has been convenient for discussion purposes to assume rectangular step phase errors and rectangular step phase correcting devices, in fact, it is to be expected that typical atmospherically induced phase errors are smoothly varying functions of position and that it is more efficient (in terms of control system circuitry) to introduce corresponding phase error-correcting devices which present a more smoothing varying correction with space than rectangular steps.

Hence, referring to FIG. 4 a method is implemented employing moving mirror phase shifters which achieves the desired smoothly varying phase correction. In this approach, a continuous metallic or glass sheet 32 having a highly polished, highly reflecting surface is attached at regular intervals to glass or ceramic members 31 which in turn are attached to one end of each of piezoelectric actuators 30, also of PZT material. Optical beam 64 from the telescope impinges on reflective surface of sheet 32 and is reflected therefrom as beam 68, the use of beam 68 being described hereinbelow in connection with FIG. 5. Actuators 30 act as displacement devices of mirror 32 when the actuators are stressed by electrical signals supplied to them from circuit 100 of FIG. 5. Each of actuators 30 have a bore along each of their cylindrical axis which bore is plated with electrically conductive material as at 18. The outer surface of each of the cylinders as at 19 is also plated with electrically conductive material. The inner surfaces 18 are electrically connected to ground to act as a return electrical path in the system of FIG. 5 or as modified by FIG. 7. Surfaces 19 are electrically connected to wires 21, 22, 23 and 24, these wires being the means for making electrical connection to the outputs of element perturbation subsystem 100 of FIG. 5. Hence, actuators 30 provide localized displacements as a function of the displacement in aperture 65 of FIG. 5 or the correction plane thereof. The continuity of the surface of the highly polished or mirrored surface of member 32 results in a smoothly varying phase delay function as diagramatically illustrated at 35.

Referring to FIG. 5, a system schematic utilizing the inventive techniques provides an overview of the apparatus needed to achieve the desired results.

The operating principle of the basic system is to sense a single measure of image quality and to maximize this measure with respect to each of the voltages applied to phase correction matrix 67. As an aid to maximizing image quality, it is generally helpful for the control system to have the ability to introduce trial path length perturbations.

The manner in which the element perturbation system 100 functions need not be discussed in detail since such system is treated in U.S. Pat. No. 3,731,103. Briefly, system 100 comprises four different electronic circuits, each circuit being fed by a different frequency, $\omega_1$, $\omega_2$, $\omega_3$ and $\omega_4$ respectively. Each said circuit is responsive to the appropriate feeding frequency which feeds operational amplifier 104 and synchronous detector 105. Output of detector 105 feeds low pass filter 106. Generally the low band pass is chosen to give a closed loop response ranging between 100–1000 Hz. The output of filter 106 also feeds operational amplifier 104. In each of these electronic circuits outputs 21, 22, 23 and 24 from the operational amplifiers are provided as imputs to the elements of matrix 67.

Hence, an optical beam as at 60 is reflected from telescope reflector 61 and impinged as beam 62 on reflector 63, to be directed by reflector 63 as beam 64 exiting through aperture 65 in reflector 61 and to impinge upon the elements of COAT control phaser matrix 67.

The elements of matrix 67 may be those shown in FIGS. 3 or 4 as hereinabove described.

Optical beam 64 from the telescope is impinged on the matrix elements of FIGS. 3 or 4 and reflected from these elements as beam 68. Beam 68 is impinged on relay mirror 66 from which is reflected beam 68' to impinge on and be reflected from beam splitter 69, to be split as beam 70 and impinge on lens 71, exiting lens 71 as beam 72 to impinge as a normal image upon a photographic plate or the like as at 73.

The other portion of beam 68' is directed through beam splitter 69 as beam 74 through lens 75 to impinge as beam 76 on image quality sensor assembly 77.

Sensor assembly 77 may be comprised of any of the configurations shown in FIGS. 6a, or 6b and 6c.

Sensor assembly 77 is represented in FIG. 6a, by one linear sensor comprising a plate as at 78 with a pinhole 79 therein to pass beam 76 through pinhole 79 and be picked up by optical photodetector as at 80, detector 80 providing an electrical output at 97, which contains the error signals encoded at each of the modulation frequencies $\omega_1$, $\omega_2$, $\omega_3$, and $\omega_4$ of FIG. 7.

Sensor assembly 77 may also be represented by a non-coherent transform detection means, shown in FIG. 6b schematically, and in FIG. 6c structurally, as another way of implementation of the image quality sensor 77. Here, an image intensifier 84, which is an optical amplifier known in the art is provided. Intensifier 84 also relays the location of the image plane as at 84'. The optical output of intensifier 84 provides an input to non-coherent Fourier cosine transform circuit at 85 which provides an optical signal, with a distribution of optical intensities as illustrated in FIG. 2b, impinging on optical detectors 86 and 87. $D_1$ represents the smaller diameter of high spatial frequency detector 87 and is approximately the diameter of the aperture at the center of low frequency detector 86, which detector 86 has a larger diameter $D_2$. Diameters D1 and D2 are shown as they relate to spatial frequency ordinate $\Omega_x$ in FIG. 2b. Divider circuit 88 will be responsive to outputs from both low and high frequency optical detectors. Such divider circuit provides error signals as at 97 comprising the ratio of high to low frequency integrated optical intensities.

Transform circuit 85 is shown in detail in U.S. Pat. No. 3,700,907, and need not be further discussed herein.

High spatial frequency optical detector 86 is comprised of an annular outer ring of material such as CdS and a low frequency ring detector 87, coaxial with and internal to ring 86, which may also be made of CdS. The outer circumferences of rings 86 and 87 are at ground potential, and leads 86' and 87' are respectively connected to rings 86 and 87 for interconnection to divider circuit 88.

Divider 88 can be constructed from an analog multiplier and an operational amplifier as described in Electronic Design News of Feb. 20, 1974, pages 34–41 or is commercially available as Model D125A made by Hybrid Systems, Inc.

Accordingly, error signals may be provided from the several detectors at 97 as outputs of image quality sensor 77 to provide inputs to analog system 100. System 100 will compute the image quality error signal by synchronously detecting the amplitude modulation $\omega_1$, $\omega_2$, $\omega_3$, $\omega_4$ on line 97 against the corresponding signals fed to perturbation circuits within system 100. These perturbation signals also reappear on lines 21, 22, 23, 24 . . . which are the outputs of system 100. These outputs connect to the complementary number of wires in FIGS. 3 or 4 so that the signals at 21-24 will impinge on either piezoelectric actuators 20 or 30 to locally phase modulate optical signal 68 originating at telescope aperture 65 as reflected beam 68' in order to provide the corrective action and improved image quality.

Referring to FIG. 7, an alternate system utilizing a digital computer as at 110 may be sustituted in FIG. 5 for subsystem 100. Inputs to computer 110 constitute the same outputs from image quality sensor 77, and the outputs from computer 110 constitute inputs 21-24 to control phaser matrix 67.

What is claimed is:

1. An adaptive imaging telescope for detecting an optical image received thereby at the telescope aperture which image is communicated by an optical beam comprising in combination:
  a movable mirror phase shifter, positioned at image plane of the telescope aperture, responsive to the optical beam, said phase shifter including a plurality of piezoelectric crystals spaced apart from each other a predetermined distance, each of the crystals have a bore therein, a first metallic film on the surface of the bore and a second metallic film on the outer surface of the crystal circumjacent the first metallic film;
  first means optically coupled to the phase shifter, for converting said optical beam into an electrical signal which is linear in magnitude with respect to the magnitude of the electrical signal; and
  second means, electrically coupling the first means and the phase shifter, for providing phase modulation of the optical beam.

2. The invention as stated in claim 1, wherein:
  the first means comprises a plate having a pinhole therein for communicating a portion the optical image therethrough, and a transducer, optically responsive to the image communicated through the pinhole, for providing an electrical output therefrom; and
  the phase shifter including a plurality of planar reflective members, one said member being attached to a corresponding one of the crystals at one end of the crystal, the plane of each of said reflective members being substantially perpendicular to the axis of the bore.

3. The invention as stated in claim 2, including:
  a relay mirror, responsive to an optical image reflected from each of the reflective members, for directing said image therefrom in a predetermined path.

4. The invention as stated in claim 2, wherein said second means provides electrical excitation signals to the plurality of piezo electric crystals.

5. The invention as stated in claim 2, including:
  an optical beam splitter; and
  an optical beam focusing lens, said beam splitter being positioned substantially parallel to the relay mirror and angularly positioned with respect to the focusing lens, said beam splitter and focusing lens being both positioned intermediate the relay mirror and the first means.

6. The invention as stated in claim 5, including:
  another lens responsive to light reflected from the beam splitter; and
  means for photographing a received image by virtue of the light communicated through said another lens.

7. The invention as stated in claim 1, wherein:
  the first means comprises a plate having a pinhole therein for communicating a portion of the optical image therethrough, and a transducer, optically responsive to the image communicated through the pinhole, for providing an electrical output therefrom; and
  the phase shifter including a deformable reflective member adapted to one end of the crystals so that said member is oriented substantially perpendicularly to the axis of the bore of each of the crystals.

8. The invention as stated in claim 7, including:
  a relay mirror responsive to the optical image reflected from the planar reflective member for directing said image therefrom in a predetermined path.

9. The invention as stated in claim 7, wherein said second means provides electrical excitation signals to the plurality of piezoelectric crystals.

10. The invention as stated in claim 7, including:
  an optical beam splitter; and
  an optical beam focusing lens, said beam splitter being positioned substantially parallel to the relay mirror and angularly positioned with respect to the focusing lens, said beam splitter and focusing lens being both positioned intermediate the relay mirror and the first means.

11. The invention as stated in claim 10, including:
  another lens responsive to light reflected from the beam splitter; and
  means for photographing a received image by virtue of the light communicated through said another lens.

12. The invention as stated in claim 1, wherein:
  the first means comprises transform means, responsive to the optical image, high and low spatial frequency detectors, positioned substantially in parallel planes, responsive to the optical image emanating from the transform means, and a divider circuit, responsive to outputs from and electrically connected to the high d low spatial frequency detector, and where
  said metallic films provide means for making electrical connection to the phase shifter and where the phase shifter has a plurality of planar reflective members, one of said reflective members being attached to a corresponding one of the crystals at one end thereof, the plane of each of said reflective members being substantially perpendicular to the axis of the bore.

13. The invention as stated in claim 12, including:
  a relay mirror, responsive to the optical image reflected from each of the reflective members, for directing said image therefrom in a predetermined path.

14. The invention as stated in claim 12, wherein said second means provides electrical excitation signals to the plurality of piezoelectric crystals.

15. The invention as stated in claim 12, including:
  an optical beam splitter; and
  an optical beam focusing lens, said beam splitter being positioned substantially parallel to the relay mirror and angularly positioned with respect to the focusing lens, said beam splitter and focusing lens being both positioned intermediate the relay mirror and the first means.

16. The invention as stated in claim 15, including:
  another lens responsive to light reflected from the beam splitter; and
  means for photographing a received image by virtue of the light communicated through said another lens.

17. The invention as stated in claim 1, wherein:
  the first means comprises transform means, responsive to the optical image, high and low frequency detectors, positioned substantially in parallel planes; responsive to the optical image emanating from the transform means, and a divider circuit, responsive to outputs from and electrically connected to the high and low frequency detectors, and where said metallic films provide means for making electrical connection to the phase shifter, the phase shifter having a deformable reflective member adapted to one end of the crystals so that said member is oriented substantially perpendicularly to the axes of the bore of each of the crystals.

18. The invention as stated in claim 17, including:
a relay mirror, responsive to the optical image reflected from the reflector member for directing said image therefrom in a predetermined path.

19. The invention as stated in claim 17, wherein said second means provides electrical excitation signals to the plurality of piezoelectric crystals.

20. The invention as stated in claim 17, including:
an optical beam splitter; and
an optical beam focusing lens, said beam splitter being positioned substantially parallel to the relay mirror and angularly positioned with respect to the focusing lens, said beam splitter and focusing lens being both positioned intermediate the relay mirror and the first means.

21. The invention as stated in claim 20, including:
another lens responsive to light reflected from the beam splitter; and
means for photographing a received image by virtue of the light communicated through said another lens.

* * * * *